Patented Apr. 15, 1941

2,238,858

UNITED STATES PATENT OFFICE 2,238,858

COLORING CEMENT ARTICLES

Albert Hloch, Bitterfeld, Germany, assignor to I. G. Farbenindustrie Aktiengesellschaft, Frankfort-on-the-Main, Germany No Drawing. Application April 11, 1939, Serial No. 267,346. In Germany October 21, 1936

6 Claims. (Cl. 8—8)

This invention relates to a process for coloring cement articles and is a continuation in part of my application bearing Serial No. 167,033 and filed in the United States Patent Office on October 2, 1937, bearing the title Process for providing cement articles with a superficial coloring.

Artificial stones composed of cement, such as asbestos-cement roofing plates, are mostly colored, for practical use, in a tone differing from their inherent grey color. This can be effected by incorporating coloring matters with the cement matrix. Experience shows that a considerable amount of the added substance is needed for this purpose, which prejudices economic production, and in addition, unfavourably affects the mechanical properties of the cement plates.

If the grey artificial-stone plates be colored by means of a superficial coating, this latter can never attain the hardness and strength of the heavily compressed asbestos-cement plates, and such a coating is therefore not an equivalent substitute for the coloring process first mentioned.

Moreover, a special defect attending the employment of asbestos-cement plates out of doors is that, in course of time, the surface exhibits an efflorescence which renders the colored plates unsightly. Such efflorescence is known to be due to the circumstance that water, in penetrating into the plates, dissolves soluble salts, which are deposited on the surface when the water evaporates. Such salts can also be dissolved, in presence of water, out of plates which do not contain any soluble salts, as the result of the action of sulphur dioxide present in the air, especially in the vicinity of large industrial establishments, and are then deposited on the surface of the plates.

It is an object of the present invention to provide a process for the coloring of cement plates and similar articles made of cement, hereinafter included broadly in the term "cement plates," which coloring penetrates into the depth of the cement plates and is therefore of a more durable quality than the colorings obtained by the above mentioned processes.

A further object of the invention is to provide colorings of cement plates which are not liable to produce efflorescences when exposed to out of doors conditions.

The process according to the present invention essentially consists in submitting the freshly made cement plates (i. e. plates in which setting has not yet taken place to any substantial extent) to a soaking treatment with a solution of a suitable heavy metal salt or salts, and subsequently submitting the articles to an after-treatment with an alkaline reacting solution of a compound or compounds containing available chlorine and thus having an oxidising effect. Suitable compounds containing available chlorine are e. g. calcium hypochlorites, alkali metal hypochlorites, and particularly bleaching powder.

Heavy metal salts suitable for furnishing, by reaction with alkaline solutions, the coloring compounds viz. heavy metal oxides, peroxides and/or hydroxides to be incorporated in the superficial layers of the articles, are particularly the chlorides and nitrates. They may be applied to the article in the form of their aqueous solutions which are generally acid-reacting, or dissolved in organic liquids, such as alcohol or acetone. By comparison with the employment of aqueous solutions, the employment of organic liquids as solvents for the heavy metal salts offers the advantage that hydrolysis of the heavy metal salts progresses substantially more slowly, thereby leaving more time for the penetration of the heavy metal salt solution into the superficial layers of the cement articles, and thus ensuring a more thorough and improved coloring effect.

It has also been found advantageous to maintain the hydrogen-ion concentration of the saline solutions to be employed in the soaking treatment in accordance with the present invention at between 3 and 7, since more acid solutions may strongly attack the cement and lower its capacity for coloration. For this reason it is preferable, e. g. when producing coloration with the aid of iron salts such as ferric chloride, the solutions of which have a strongly acid reaction, to convert the ferric chloride into ferrous chloride prior to its application, the simplest method being to add the required quantity of iron scrap to the ferric chloride bath.

The fact that the cement plates produced by the process of the present invention show no efflorescences under out of doors conditions is probably due to the fact that the heavy metal salts incorporated in the superficial portions of the article to be treated in the first stage of the process, react, in the subsequent treatment of the article with the alkaline solutions containing available chlorine with the latter to form hygroscopic salts. Thus e. g. the reaction of manganese chloride used in the soaking operation, with a bleaching powder solution employed in the after-treatment furnishes manganese oxide, and simultaneously also hygroscopic calcium chloride. When using alkali metal hypochlorites for the after-treatment, calcium chloride is also formed, the available chlorine causing precipitation of heavy metal oxides or hydroxides having a coloring effect from the agent used in the soaking treatment while simultaneously giving rise to the formation of hygroscopic acid, the excess of which reacts with the oxidic calcium compounds forming part of the freshly made cement so as to yield hygroscopic calcium chloride.

*Example I*

Asbestos-cement plates, fresh from the press, and preferably not more than 1 or 2 days old, are placed on racks and immersed in a bath composed of 100 parts of water, 10 parts of manganese chloride, 1 part of ferric chloride and 0.1 part of iron scrap, which has been left for at least 24 hours with occasional stirring, the plates being allowed to remain for about 20 to 30 minutes in the agitated bath. After being removed from the bath and rinsed, the plates are dipped, for 5 minutes, in a solution containing about 2 parts of bleaching powder to 100 parts of water. The plates are then freed from superficially adhering oxides, and exhibit a durable blackish-brown color, free from efflorescence.

*Example II*

Asbestos-cement plates are coated on one side with an alcoholic solution of ferric chloride, of about 3 to 5% strength, by the aid of suitable color-distributing rollers, and are then dried at a moderate heat, after which they are dipped, for about 5 minutes, in a solution containing about 2 parts of bleaching powder to 100 parts of water. A rust-brown superficial coloring is produced, on which no efflorescence will appear when the plates are used in the open air.

I claim:

1. A process for imparting to cement articles a superficial coloration which comprises first treating the freshly made article with a solution of a heavy metal salt adapted to furnish, by reaction with alkaline agents, a substantially water-insoluble coloring compound, and subsequently submitting the article to a treatment with an alkaline reacting agent containing available chlorine so as to precipitate said coloring compound in the superficial layers of said article.

2. A process for imparting to cement articles a superficial coloration which comprises first treating the freshly made article with a solution of a heavy metal salt adapted to furnish, by reaction with alkaline agents, a substantially water-insoluble coloring compound, the pH value of such solution being adjusted to between about 3 and about 7, and subsequently submitting the article to a treatment with an alkaline reacting agent containing available chlorine so as to precipitate said coloring compound in the superficial layers of said article.

3. A process for imparting to cement articles a superficial coloration which comprises first treating the freshly made article with a solution, in an organic solvent, of a heavy metal salt adapted to furnish, by reaction with alkaline agents, a substantially water-insoluble coloring compound, and subsequently submitting the article to a treatment with an alkaline reacting agent containing available chlorine so as to precipitate said coloring compound in the superficial layers of said article.

4. A process for imparting to cement articles a superficial coloration which comprises first treating the freshly made article with a solution, in an organic solvent, of a heavy metal salt adapted to furnish, by reaction with alkaline agents, a substantially water-insoluble coloring compound, the pH value of such solution being adjusted to between about 3 and about 7, and subsequently submitting the article to a treatment with an alkaline reacting agent containing available chlorine so as to precipitate said coloring compound in the superficial layers of said article.

5. A process for imparting to cement articles a superficial coloration which comprises first treating the freshly made article with a heavy metal salt solution comprising iron chloride, the pH value of such solution being adjusted to between about 3 and about 7, and subsequently submitting the article to a treatment with a bleaching powder solution containing available chlorine.

6. A process for imparting to cement articles a superficial coloration which comprises first treating the freshly made article with an alcoholic solution of ferric chloride of between about 3 and about 5% strength, and subsequently submitting the article to a treatment with a bleaching powder solution of about 2% strength containing available chlorine.

ALBERT HLOCH.